United States Patent

Macchiarulo et al.

[11] Patent Number: 5,498,214
[45] Date of Patent: Mar. 12, 1996

[54] PROCESS FOR MANUFACTURING TOOTHED BELTS OF ELASTOMERIC MATERIAL AND TOOTHED BELT MADE BY SAID PROCESS

[75] Inventors: Vincenzo Macchiarulo, Pescara; Tommaso Di Giacomo, Guardiagrele; Danilo Di Cesare, Chieti; Marino Petaccia, Lettomanoppello, all of Italy

[73] Assignee: Pirella Transmissioni Industriali S.p.A., Chieti, Italy

[21] Appl. No.: 439,569

[22] Filed: May 11, 1995

Related U.S. Application Data

[62] Division of Ser. No. 983,171, Nov. 30, 1992, Pat. No. 5,421,927.

[30] Foreign Application Priority Data

Nov. 29, 1991 [IT] Italy .................. MI91A03195

[51] Int. Cl.$^6$ ........................... F16G 5/08
[52] U.S. Cl. ........................... 474/268
[58] Field of Search ................ 474/237, 238, 474/260–268, 205

[56] References Cited

U.S. PATENT DOCUMENTS

| | | |
|---|---|---|
| 2,354,062 | 7/1944 | Ritzert et al. |
| 3,250,653 | 5/1966 | Geist et al. ............... 156/138 |
| 3,937,094 | 2/1976 | Cicognani ............... 474/205 |
| 4,083,838 | 4/1978 | Breher et al. |
| 4,395,298 | 7/1983 | Wetzel et al. ............... 156/446 |
| 4,448,621 | 5/1984 | Marsh et al. |
| 4,626,232 | 11/1986 | Witt ............... 156/138 |
| 4,701,154 | 10/1987 | Raush ............... 474/268 X |
| 4,832,673 | 5/1989 | Nagai et al. ............... 474/268 X |
| 4,861,403 | 8/1989 | Yoshimi et al. ............... 156/138 |
| 5,378,206 | 1/1995 | Mizuno et al. ............... 474/268 X |

FOREIGN PATENT DOCUMENTS

0308550  3/1989  European Pat. Off.

OTHER PUBLICATIONS

EPO Communication Nov. dated 28, 1994 in related application (Application No. 92120391.5–2307 (3 sheets).

*Primary Examiner*—Michael Powell Buiz
*Attorney, Agent, or Firm*—Stevens, Davis, Miller & Mosher

[57] ABSTRACT

In a process for manufacturing toothed belts of any length, a tubular sleeve comprising a layer of cords (1) and at least a layer of elastomeric material (2) is preformed in an autoclave without being vulcanized so as to produce, on the inner surface thereof, a plurality of grooves (5) spaced apart from one another according to a predetermined toothing pitch (P). The sleeve is helically cut to obtain a continuous strip (7) to be subsequently wrapped over two wrapping drums (8, 9) suitably spaced apart from each other depending on the circumferential extension to be given to the belt. The obtained annular element (10), when the wrapping has been completed, is trued up by means of the provided grooves, between a molding matrix (11) and opposite mould (12) and is submitted to a pressing step and simultaneous cross-linking of the elastomeric material (2) by closing said elastomeric material between the molding matrix (11) and opposite mold (12) according to stages in succession. Thus the complete formation of the teeth (3) on the inner side of the belt being worked occurs, as well as the firm bonding of the continuous loops (10a) formed by wrapping of the continuous strip (7).

6 Claims, 4 Drawing Sheets

PROCESS FOR MANUFACTURING TOOTHED BELTS OF ELASTOMERIC MATERIAL AND TOOTHED BELT MADE BY SAID PROCESS

REFERENCE TO RELATED APPLICATION

This application is a division of U.S. Ser. No. 07/983,171, filed Nov. 11, 1992 which will issue on Jun. 6, 1995 as U.S. Pat. No. 5,421,927.

BACKGROUND OF THE INVENTION

1. Field of Invention

The present invention relates to a process for manufacturing toothed belts of elastomeric material, comprising the following steps: making a semifinished product in the form of a continuous strip; wrapping the semifinished product in the form of a strip over at least two wrapping rollers having parallel axes and being spaced apart according to a predetermined distance between centers, said wrapping being carried out according to a wrapping pitch corresponding to the width of the semifinished product in order to achieve an annular element of the desired circumferential extension or length, of at least the same width or axial length as the toothed belt to be achieved and formed with a plurality of loops disposed in mutual side-by-side relation.

The invention also relates to a toothed belt of elastomeric material of the type comprising: at least a layer of reinforcing cords of annular configuration; at least a layer of elastomeric material incorporating said reinforcing layer and exhibiting, on an inner surface thereof, a plurality of teeth extending transversely to the circumferential extension or length of the belt and spaced apart from each other by the same distance, according to a predetermined toothing pitch.

2. Prior Art

It is known that toothed belts of elastomeric material consist of a body closed in the form of a loop and are essentially comprised of a layer of longitudinal reinforcing cords incorporated within at least a layer of elastomeric material in which a plurality of shaped teeth, spaced apart from each other by the same distance according to a predetermined toothing pitch, are defined on the inner side of the circumferential belt extension.

The manufacture of these belts involves producing a tubular sleeve having inner and outer circumferential surfaces which is obtained by successively wrapping the layer of reinforcing cords and the layer of elastomeric material in the raw state over a cylindrical drum having axially extending grooves or tooth spaces matching the shape of the toothing to be achieved.

The sleeve disposed on the drum is then submitted to a simultaneous molding and cross-linking process within an autoclave. In particular, the sleeve is submitted to a homogeneously applied pressure for a predetermined period of time. Thereafter the elastomeric material is urged into the axially extending grooves of the drum in order to cause the formation of teeth.

During this process, the overall processing time of which is not generally less than 15 minutes, the sleeve is submitted to high temperatures, generally in the range of 150° to 170° C., in order to cause the complete cross-linking of the elastomeric material and, consequently, the structural stabilization of the obtained toothed sleeve.

As far as mass production is concerned, the circumferential extension or length of the drum on which the sleeve is formed is normally coincident with the circumferential extension or length that the finished belts must have. In such cases it is sufficient to slit the sleeve according to several suitably axially spaced circumferentially-parallel lines in order to obtain a plurality of belts having the desired circumferential extension and axial width.

There are, however, many other cases in which the circumferential extension of the drum, and consequently that of the obtained sleeve, is smaller than the circumferential extension that the finished belts must have.

This occurs for example when it is necessary to produce belts of a given circumferential extension in relatively small supplies, which does not justify preparing drums of sizes selected for purposes of producing such belts. In other cases the circumferential extension of required belts may be so great that making drums of very large sizes is involved, so large in fact that they cannot even be introduced into available factory equipment, such as for example vulcanization and molding autoclaves, and grinding and packaging machines.

In order to solve such problems, the sleeve obtained from the molding and cross-linking process is slit according to a line of helical extension, the pitch of which is coincident with the width of the belts to be achieved. In this way a semifinished product in the form of a continuous strip is produced which lends itself to be cut to size according to the circumferential extension of the desired belt which is thus obtained by joining end-to-end the opposite ends of the strip length cut to size.

By this method it is possible to produce toothed belts of any circumferential extension, but it is necessary to accept the unavoidable structural weakening of the belt caused by the end-to-end junction present on the circumferential extension thereof.

U.S. Pat. No. 4,083,838 discloses a method by which it is possible to obtain belts of thermoplastic material in the desired length without end-to-end junctions of the above described type being required.

In accordance with this method, a semifinished product in the form of a continuous strip, on which a toothing in its final configuration has been previously produced, is passed over two rollers having parallel axes, mutually positioned according to a distance between centers corresponding to the desired circumferential extension to be given to the obtained belt. The wrapping of the semifinished product is carried out helically according to a pitch corresponding to the width of the semifinished product so as to form a plurality of loops disposed consecutively in side-by-side relation and mating at the respective opposite edges.

A heating means is provided close to one of the rollers on which the wrapping is carried out, said means, assisted by a presser ribbon guided according to a determined wrapping arc about the roller, causing the plasticization of the thermoplastic material forming the semifinished product, so that the loops disposed in side-by-side relation are firmly bonded to each other.

Thus an annular toothed element is produced that lends itself to be cut according to circumferential lines thereby giving rise to a plurality of belts having the desired width and circumferential extension.

Presently it is impossible to use the above method to make toothed belts in which elastomeric material is used in place of the thermoplastic material.

In fact, cross-linking carried out in the autoclave before the semifinished product takes the form of a continuous belt would make the subsequent melting of the elastomeric material for obtaining the mutual junction between contiguous loops an impossible achievement.

In accordance with his own experience, the Applicant has conceived of lowering the temperature and residence times of the manufactured article in the autoclave, in order to avoid cross-linking of the elastomeric material, which operation would have been executed in a subsequent step; however, it has been found that the formation of teeth on the inner surface of the sleeve did not take place in a regular manner, so that it was impossible to resort to this procedure.

In accordance with the present invention it has been found that in order to obtain toothed belts made of elastomeric material, of any circumferential extension without mechanical junctions, it is possible to resort to a process in which the above autoclaving step is used to fundamentally form the toothing pitch without cross-linking the elastomeric material. That is, intertooth spaces and teeth, the configurations of which only partly correspond to the final configuration of the teeth are first produced, and, in a subsequent step, cross-linking of grooves (and/or projections) is conducted by placing the noncross-linked product between two mold members, and pressing the members together in the presence of heat to give the teeth their ultimate shape and, by cross-linking of the elastomeric material, causing the contiguous loops of the annular element to adhere to each other so as to form a belt of the desired length devoid of any mechanical junctions. In practice, a process is adopted in which a semifinished product, in the form of a continuous strip, is obtained by helically cutting a sleeve that has been previously subjected in an autoclave to a preforming step which is not necessarily intended to complete construction of teeth but does form teeth and intertooth spaces or grooves according to the toothing pitch to be given to the belts, without, however, cross-linking the elastomeric material present in the sleeve. The semifinished product thus obtained in the form of a continuous strip is then helically wrapped about two spaced apart rollers, which are spaced by a distance depending on the desired belt extension or length, in order to produce an endless ring the adjacent loops of which, as they are in the raw state, enable the cross-linking of the elastomeric material to take place after the ring has been cut to the desired width, which results in the production of a junction-free belt. Intertooth spaces or grooves, obtained in the preforming operation are then used to true up the annular element obtained from the strip wrapping, on a matrix employed for molding and cross-linking the final toothing profile.

The present invention in one main aspect thereof relates to a process for manufacturing toothed belts of elastomeric material comprising the following steps: making a sleeve having circumferentially extending inner and outer surfaces, the inner such surface having intertooth spaces and teeth; cutting the sleeve according to a cutting line of helical extension so as to obtain a semifinished product in the form of a continuous strip; wrapping said semifinished product in the form of a continuous strip over two spaced apart wrapping toothed rollers having axes parallel to one another and positioned according to a predetermined distance measured from the centers of said axes, said wrapping being carried out at a pitch corresponding to the width of the semifinished product in order to obtain an annular element of the desired circumferential extension having at least the same width as the toothed belt to be produced and formed with a plurality of loops disposed in mutual side by side relation, characterized by:

a) controlling the temperature and time of the sleeve-making step so as to obtain a plurality of alternate intertooth spaces or grooves and teeth to preform the teeth defining the belt pitch while avoiding cross-linking the elastomeric material of the sleeve;

b) trueing up the annular element in the raw state, by means of said intertooth spaces or teeth positioned between a molding matrix and an opposing mold member;

c) pressing the matrix and the mold toward each other to compress the sleeve and applying heat thereto to vulcanize the sleeve, so as to mold the teeth to the final shape and cause the mutual bonding of the side-by-side loops of the annular element in the raw state, thereby giving rise to a belt of desired length, without mechanical junctions.

More particularly, this process is characterized in that the production of the semifinished product in the form of a continuous strip takes place through the following steps: a cylindrical tubular sleeve is manufactured by wrapping at least a layer of textile reinforcing fibers and at least a layer of raw elastomeric material over a preforming drum with substantially longitudinal teeth circumferentially distributed according to a predetermined toothing pitch; preforming the tubular sleeve by compressing the elastomeric material against the preforming drum teeth so as to produce, on the inner circumferential surface of said sleeve, a plurality of substantially longitudinal grooves distributed according to said toothing pitch, associated with tooth preforming projections; cutting the tubular sleeve according to a cutting line of helical extension, so as to obtain said semifinished product in the form of a continuous strip of predetermined width having transverse grooves distributed according to said toothing pitch, after said wrapping step the annular element provided with said transverse hollows on an inner surface thereof being submitted to the steps of: pressing the annular element between a molding matrix and an opposing mold member which matrix and member act on the inner surface and an outer surface respectively of the annular element so as to define on said inner surface a plurality of shaped teeth spaced apart by transverse grooves; cross-linking the elastomeric material present in the annular element by administering heat thereto, in order to cause the mutual bonding of said loops disposed in side-by-side relation during the wrapping step, as well as a structural stabilization of the obtained toothed belt.

Advantageously, during said pressing step a final mutual trueing of the respectively aligned transverse grooves belonging to the individual loops of the semifinished product previously wrapped in the form of a strip, is carried out.

During said wrapping step a mutual alignment of the transverse grooves present in the individual loops of said semifinished product in the form of a strip is also preferably executed. This alignment is obtained by engagement of said grooves on longitudinal-alignment teeth provided on said wrapping rollers, which are spaced apart by the same distance as said toothing pitch.

Preferably, in the production of the cylindrical tubular sleeve a coating fabric is first placed on the preforming drum before carrying out the wrapping of the textile fiber layer and the raw elastomeric material.

In addition, during said pressing step, a covering fabric previously interposed between said molding matrix and the annular element may also be fastened to the inner surface of the annular element. The application of a covering fabric to the inner surface of the annular element can be exploited in order to execute a presetting of the loops of the semifinished product in the form of a strip before the pressing step.

In this case said covering fabric is applied during said wrapping step by positioning the covering fabric between the wrapping rollers and the annular element being worked.

Alternatively, the mutual presetting of the loops formed with said semifinished product can take place through application, after said wrapping step, of an outer coating sheet to the outer surface of the annular element wrapped around said wrapping rollers.

The cross-linking step of the elastomeric material is preferably obtained simultaneously with the pressing step, through heating of the molding matrix and opposite mold member. In addition, the pressing step is carried out by successive stages to each of which the pressing of a portion of predetermined length of said annular element corresponds.

After the cross-linking step, the edges of the obtained toothed belt may be trimmed.

In the case in which the annular element has an important width, it is possible to execute a circumferential cutting step after said cross-linking step, in order to obtain a plurality of toothed belts of predetermined width.

Alternatively, this circumferential cutting step can be executed before the pressing step.

In accordance with a further feature of the invention, the preforming step is conducted so that the grooves on the sleeve exhibit a depth corresponding to at least 1/3 of the height detectable on the individual teeth of the finished belt, and alternate with projections the transverse preforming outline of which has a surface extension equal to at least 1/2 of the surface extension detectable on the tooth profile of the finished belt.

Preferably, in accordance with the process of the invention, after the molding step at least 10% of said projections should be only partly formed as regards their detectable height and/or their sizes as above described.

More preferably at least 30% of the projections are partly formed as above stated and still more preferably at least 50% of the projections are partly formed as above stated.

Advantageously the application of centripetal pressure during the forming step takes place concurrently with the administration of heat to the sleeve being worked.

In greater detail, the application of centripetal pressure during the preforming step is carried out in an autoclave concurrently with the administration of heat to the sleeve over a period of time determined to be between 1/6 and 1/2 of the time necessary to cause the complete cross-linking of the elastomeric material at the temperature conditions according to which the administration of heat occurs.

Alternatively, the administration of heat to the sleeve is carried out by submitting the latter to temperatures of a value included between 1/2 and 4/5 of the value needed to obtain the complete cross-linking of the elastomeric material over a period of time corresponding to the duration of the administration of heat.

In a preferred embodiment, the application of pressure during a preforming step occurs at a value in a range of 10 bar to 22 bar, over a period of time of 2 to 15 minutes, while administering heat to the sleeve at a temperature in the range 50° C. to 205° C. at the outside thereof, and in the range of 100° C. to 140° C. at the inside thereof, depending on fluid used (that is air, steam or pressurized water).

After the preforming step the material has not been subjected to a vulcanization process and, hence, physical parameters of the vulcanized item such as hardness and ultimate tensile strength are not measurable.

The invention in another aspect thereof also relates to a toothed belt of elastomeric material obtained by the above process, said belt being characterized in that said reinforcing cord layer, in the form of a continuous strip, is helically wrapped in several loops disposed in a side-by-side relation and mated at the respective opposite edges.

Preferably, the belt further comprises at least a coating fabric applied to the inner surface thereof provided with said teeth, said coating fabric being structured in the form of a continuous strip wrapped in several side-by-side loops mating at the respective opposite edges.

The belt may also comprise at least a covering fabric, which is applied to the inner surface thereof provided with teeth, said covering fabric being structured in the form of a continuous strip of the same width as the belt.

BRIEF DESCRIPTION OF THE DRAWINGS

Further features and advantages will become more apparent from the detailed description of a preferred embodiment of a process for manufacturing toothed belts of elastomeric material and a belt obtained by said process, in accordance with the present invention, given hereinafter by way of non-limiting example with reference to the accompanying drawings, in which.

Figure 1B:
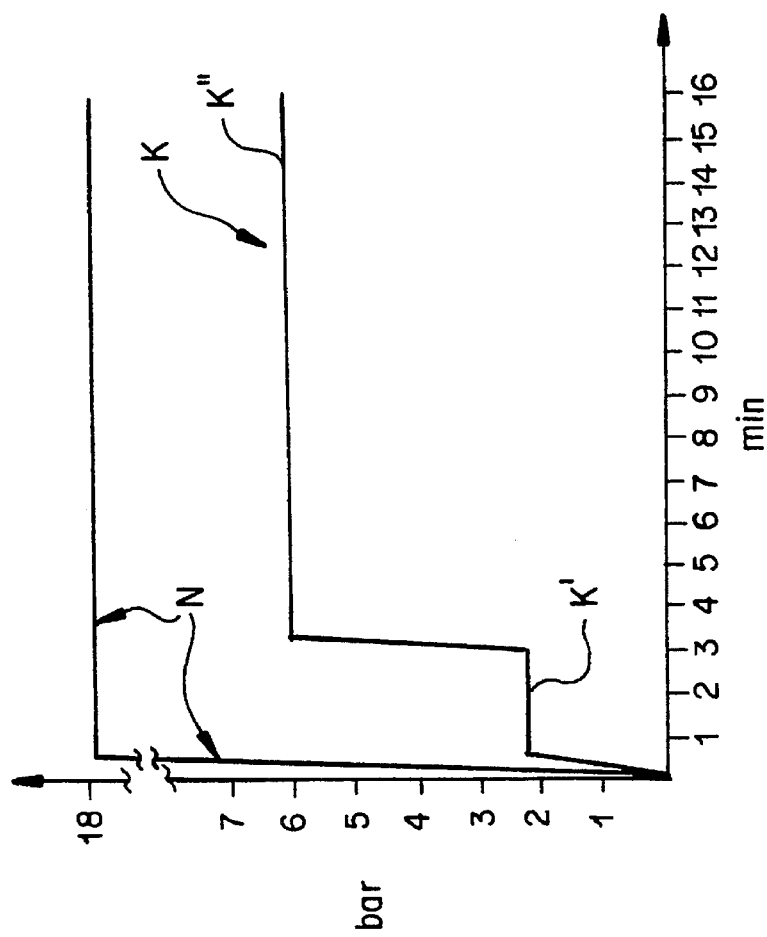
FIG. 1b shows a diagram similar to the diagram shown in FIG. 1a and relates to pressure variations in the autoclave according to the molding and cross-linking processes of the known art.
Figure 1A:
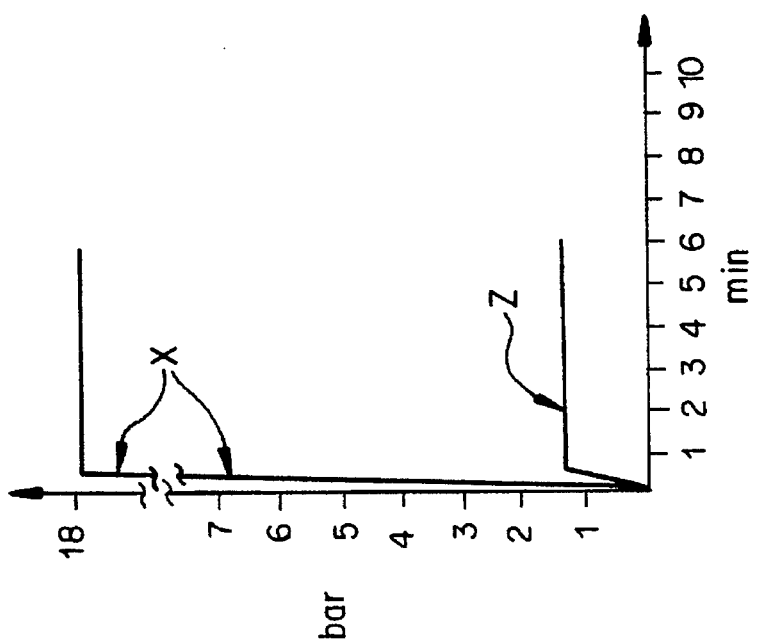
FIG. 1a shows, by way of example only, a diagram indicating the variations in time of the feed pressures in an autoclave for the execution of a preforming step in accordance with the process of the invention.

The process of the present invention relates to manufacturing driving belts of elastomeric material of the type essentially comprising at least a layer of longitudinally extending reinforcing cords 1 made of textile fibers, fiberglass (FIG. 4) or other materials such as aramide fibers or the like, as currently used in belts, incorporated within at least a layer of elastomeric material 2 shaped such as to define, on the inner surface of the circumferential belt extension, a plurality of shaped teeth 3 spaced apart from each other in a predetermined toothing pitch "P".

To this end, a cylindrical tubular sleeve having outer and inner circumferential surfaces is first made in a manner known per se by wrapping the reinforcing cord layer 1 and the elastomeric material layer 2 in a raw state and in the form of a sheet of constant thickness about a cylindrical preforming drum having on the surface thereof a plurality of substantially longitudinal teeth spaced apart from each other a distance corresponding to the toothing pitch "P".

These operations are preferably preceded by the engagement on the preforming drum of a tubular textile stock material designed to form an inner coating fabric 4 for the sleeve and hence the finished belts. The inner coating fabric 4 not only strengthens the structure of the individual teeth 3, but also makes the subsequent removal of the sleeve from the drum easier.

The tubular sleeve together with the preforming drum on which it has been formed, is then introduced into an autoclave of the type normally used for molding and cross-linking sleeves in the production processes of the known art.

Inside this autoclave, which is not shown and which is known per se, the sleeve undergoes a preforming step to create, on the inner surface of the sleeve, a plurality of shaped grooves 5 spaced apart from each other by a given toothing pitch "P" and alternated with surface projections $3a$, each of which will form one of said teeth 3.

The sleeve preforming step taking place in the autoclave is carried out by applying homogeneously distributed centripetal compression forces to the sleeve in a known manner and which is described below, so that the elastomeric material 2 urged through the textile reinforcing layer 1 and against the longitudinal teeth of the drum will at least partly fill the grooves on the drum defined by two adjacent teeth.

In order to increase the malleability of the elastomeric material 2, heat is simultaneously administered with centripetal compression to the sleeve being worked. However, the administration of heat and tile treating time in the autoclave must be adjusted so that cross-linking does not occur in the elastomeric material.

In order to accomplish this purpose, the residence time of the sleeve in the autoclave and/or the treatment temperatures therein are conveniently reduced as compared to those of the known art wherein the working cycles achieve complete formation of teeth 3 and the simultaneous complete cross-linking of the elastomeric material.

For an easier understanding, the graphs of FIG. $1a$ show, by way of example, the variations in time of the preforming treatment pressures in the autoclave carried out in accordance with the invention on a sleeve of chloroprene-based elastomeric material having the following composition:

| | |
|---|---|
| Chloroprene | 52.35% |
| Magnesium oxide + zinc oxide | 3.95% |
| Silica + activators | 11.8% |
| Blacks | 28.8% |
| Antifatigue agents | 1.55% |
| Antiozone | 1.55% |

It is pointed out that chloroprene is one example of the elastomeric materials used; other elastomeric materials that could be used include polybutadiene rubber-based materials, nitrile, hydrogenated and chlorosulfonated rubbers.

For purposes of comparison, the graph of FIG. $1b$ shows the development of pressures that can be found in the molding and cross-linking step of the known art on a sleeve of elastomeric material identical to the one specified above.

Referring to the conventional cycle in an autoclave as shown in FIG. $1b$, the centripetal compression on the sleeve is obtained for example by admitting water overheated to a temperature of 164° C. and at a pressure of 18 bar as shown by curve "N", into an elastomeric plenum chamber conventionally provided in the autoclave and externally surrounding the sleeve fitted on the drum. These conditions are the same over the whole operating cycle of the autoclave which cycle is of a duration of approximately 16 minutes.

Still, with reference to FIG. $1b$, the curve marked by shows the variation in time of the pressure of the steam admitted into the drum carrying the sleeve, according to known procedures. In a starting step, lasting about three minutes, as shown by the initial length K' of curve K, the steam pressure in the drum is maintained at a value of about 2.2 bar at a temperature of 134° C., in order to cause plasticization of the elastomeric material. In a subsequent cross-linking step, shown by length "K''" of curve K, the steam pressure within the drum is raised up to about 6 bar, at a temperature of 164° C. and these conditions are maintained over the remaining 13 minutes of the operating cycle, at which time the cross-linking of the elastomeric material comes to an end.

As mentioned above, according to the known art, final formation of teeth 3 on the inside circumferential surface of the sleeve occurs, as well as the cross-linking of the elastomeric material 2.

However, unlike the above procedures, in the preforming step carried out in the example shown in FIG. $1a$ the operating cycle in the autoclave is reduced to about 6 minutes during which steam, admitted into the drum, is maintained at a pressure of 1.2 bar at a temperature of 120° C., as shown by curve "Z". The overheated water introduced into the plenum chamber surrounding the sleeve is maintained at a pressure of about 18 bar and at a temperature of 164° C., as shown by curve "X".

It is noted that the important reduction in the time of the operating cycle in the autoclave together with the small reduction in the treatment temperatures and steam pressure within the preforming drum causes the preforming step to occur without any risk of giving rise to cross-linking the elastomeric material 2.

Figure 3:
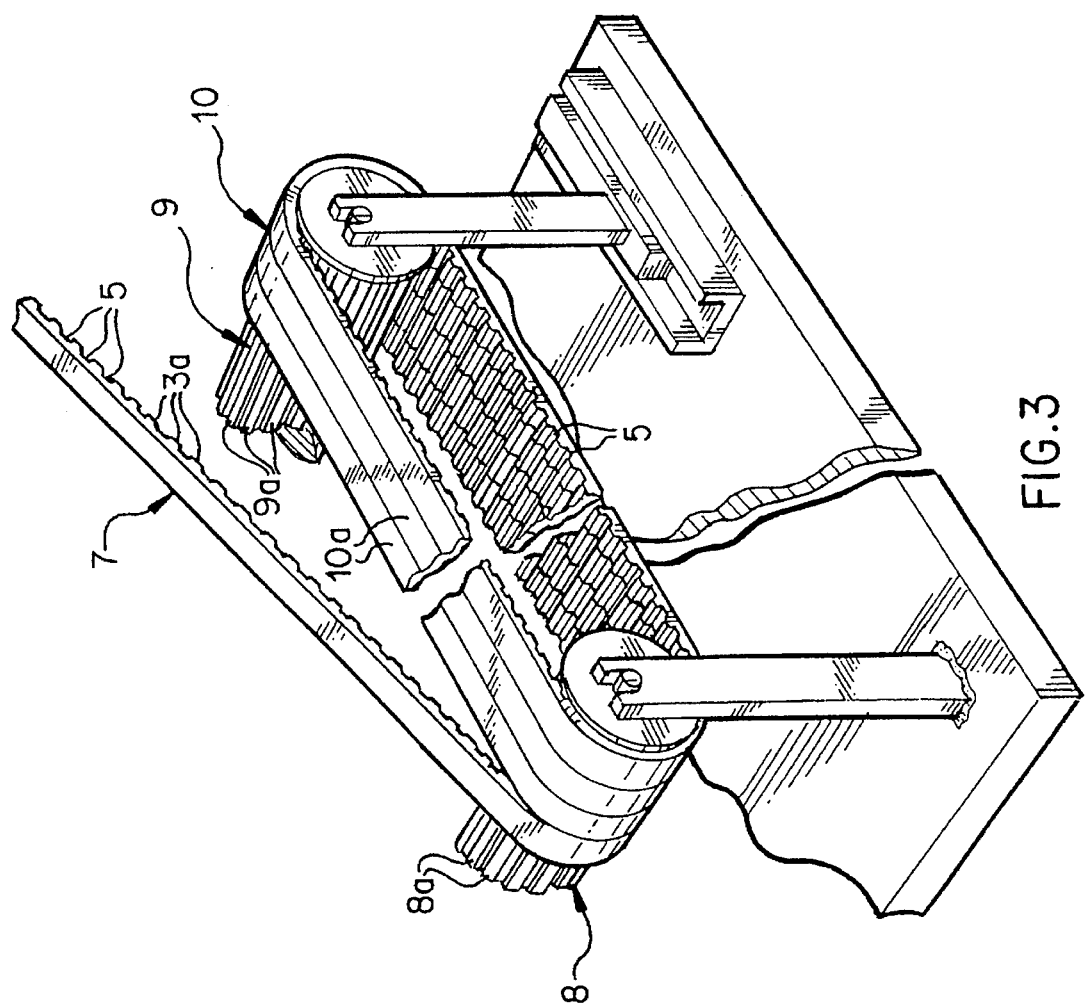
FIG. 3 shows a diagrammatic perspective view of the execution of a wrapping step of a semifinished product in the form of a continuous strip over a pair of mutually spaced apart wrapping rollers.
Figure 5:
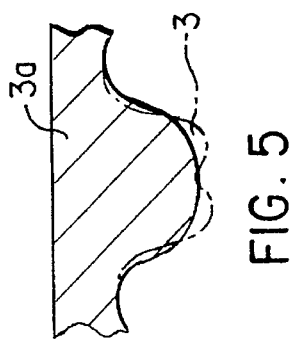
FIG. 5 diagrammatically shows the superimposition of the outlines of a completely formed tooth (in dotted line) and a tooth not completely formed (in solid line), respectively.
Figure 4:
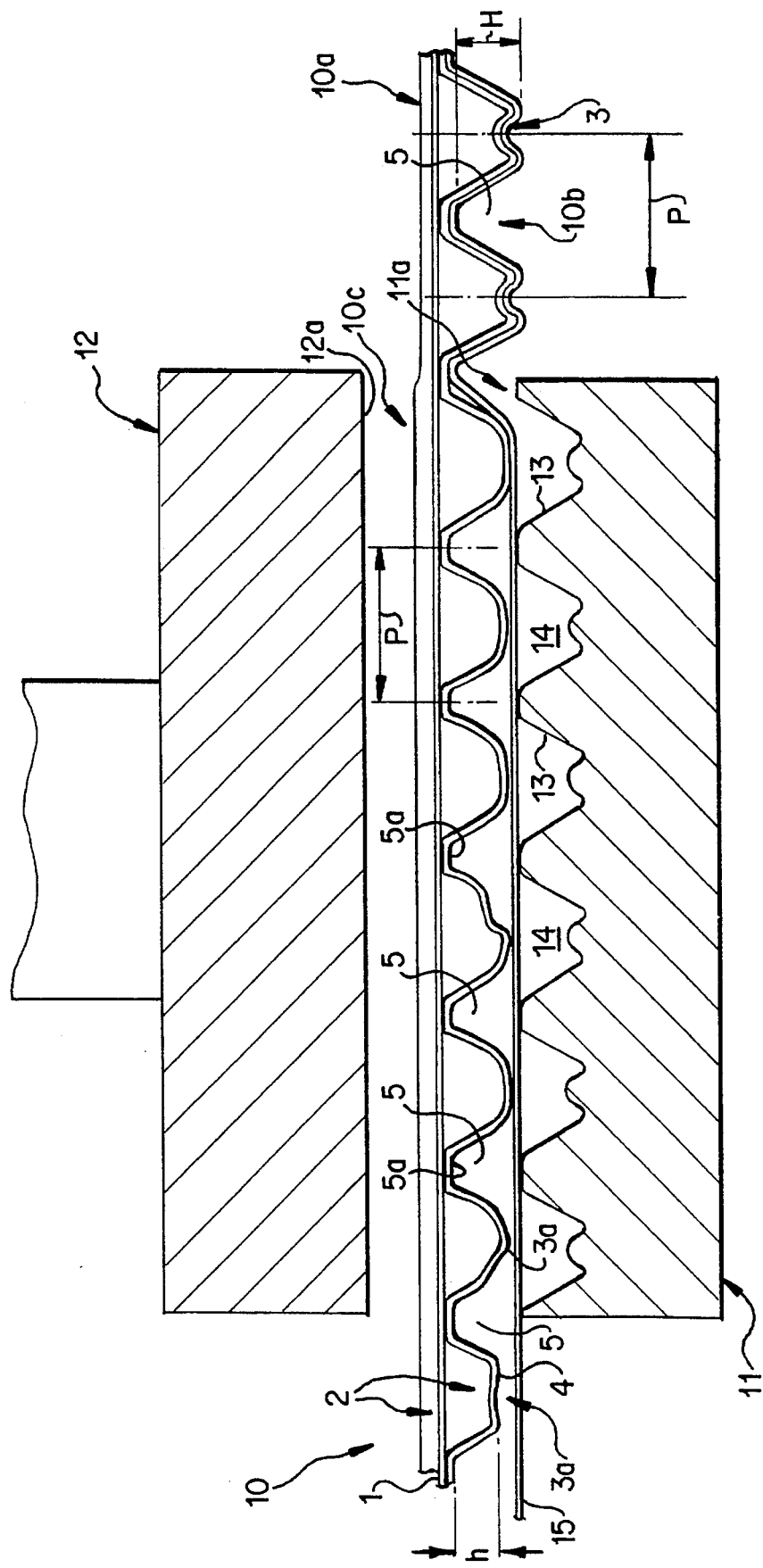
FIG. 4 shows, in section, a side view of a portion of an annular element disposed between a matrix and an opposite mold and being submitted to a final-molding and cross-linking step.

The important reduction in time of the operating cycle in the autoclave, due to possible temperature differences in the various areas of the autoclave or for other reasons, leads to the formation of projections that can at least partly correspond to the final shape of teeth 3, as intentionally emphasized in FIGS. 3 and 4. In particular, taking into account the fact that the sleeve is disposed in the autoclave according to a vertical axis, teeth 3 can show a gradual reduction in height along the longitudinal extension of the sleeve towards the lower part thereof, but they will in all event exhibit the respective base walls $5a$ (FIG. 4) mutually levelled adjacent the cord layer 1.

Advantageously, in the process of the invention, for reasons made clear below, the presence of possible projections which are different from one another and from the final form of the teeth 3 do not give rise to any qualitative deficiency in the finished product.

In fact it has been found that in order to achieve a final product having satisfactory characteristics it is sufficient that the depth of grooves 5 denoted "h" in FIG. 4, be at least equal to ⅓ of the overall height "H" of the tooth 3 in the finished product. It is also important to point out that preferably the surface length of the transverse profile of each projection $3a$ defined between two contiguous grooves 5 must at least correspond to ½ of the surface length of the transverse profile of each individual tooth 3.

It has also been found that the above parameters are complied with if in the inside of the autoclave the administration of heat to the sleeve is carried out over a period of time included between ¼ and ½ of the time needed for causing the complete cross-linking of the elastomeric material at temperature conditions according to which the heat administration occurs. In other words, it is pointed out that even if the temperature and pressure conditions are kept substantially unchanged as compared to the autoclave cycle of the known art, the duration of the operating cycle for achieving the preforming cycle of the invention is reduced to between 1/6 and 1/2 of the duration of the conventional operating cycle in an autoclave.

Alternatively, the administration of heat to the sleeve can be carried out by submitting the latter to temperatures ranging from 1/2 to 4/5 of the value required for achieving the complete cross-linking of the elastomeric material, over a period of time corresponding to the conventional duration of the administration of heat. In other words, the duration of the preforming step can even be as long as the duration of the known operating cycle, in which case in order to prevent cross-linking in the elastomeric material, the operating temperatures within the preforming drum and in the autoclave plenum chamber should conveniently be reduced to a value in the range of 2/3 to 4/5 of the temperatures detectable in a conventional autoclave cycle.

Obviously, depending on the different requirements within the above specified limits, it will be possible to select any time and temperature combination adapted to produce sufficiently deep hollows 5 without causing the elastomeric material to cross-link.

In a preferred solution the centripetal compression in the preforming step should be included between 15 bar and 21 bar, the residence time in the autoclave between 3 and 10 minutes and the temperature in the preforming drum, that is within the sleeve, between 100° C. and 140° C., and the temperature on the outside of said sleeve ranging from 50° C. to 205° C.

The absence of cross-linking in the elastomeric material submitted to the preforming step can be confirmed by examining the rheometric features of a sample of this material, and comparing such features with the rheometric features detectable on a coupon of identical material produced under the same test conditions that has not been submitted to the preforming cycle in the autoclave.

Figure 2A:
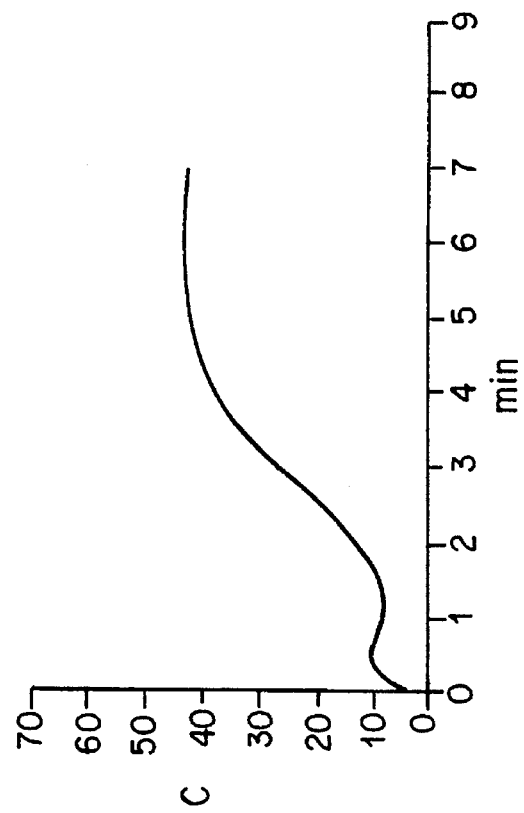
FIGS. 2a and 2b show diagrams obtained through the so-called "Monsanto tests" carried out respectively on a coupon of elastomeric material submitted to the preforming cycle in an autoclave and on a coupon of raw elastomeric material, of the same type, not submitted to said cycle.
Figure 2B:
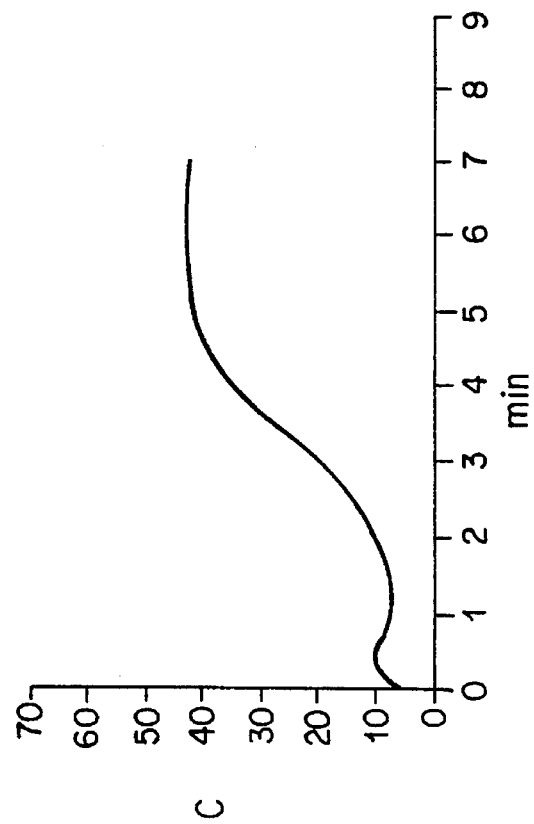

Diagrams shown in FIGS. 2a and 2b show the results achieved by carrying out a test, known to those skilled in the art as the "Monsanto-test", on a sample of elastomeric material previously submitted to a preforming cycle and a sample of the same raw material not submitted to said cycle, respectively.

For the sake of completeness, it is pointed out that the "Monsanto test" substantially consists in putting an elastomeric sample, of 5 cm diameter and 3 mm thickness, in a chamber heated to a controlled temperature, in this case corresponding to 185° C., and detecting the variation in time of torque "C" (to be measured in Newton·meter) necessary to cause the angular oscillation (according to an angle of 1° to 3° in absolute value) of a disk rotatably housed within said chamber.

The increase of the torque value in time, detectable from graphs in FIGS. 2a and 2b, is the cross-linking index taking place in the elastomeric material by effect of its standing at high temperature and will be stabilized when the cross-linking has been completed.

As can be seen, the graphs depicted in FIGS. 2a and 2b, are practically identical, which means that the elastomeric material sample submitted to the cycle corresponding to the preforming step is still in a raw state, in that it exhibits the same behavior as the raw material sample that has not yet been submitted to any treatment in the autoclave.

In principle, the elastomeric material 2 of the preformed sleeve is preferably provided to exhibit, after a test in a Mooney viscosimeter carried out in accordance with ASTM 1646-80 standards, a viscosity increase lower than 10%.

It is also noted that in the described example the hardness of the elastomeric material after the preforming step is not measurable because the material is not vulcanized, whereas the hardness of the same material on the finished belt has a value ranging from 60 to 90 Shore A.

In accordance with the process of the invention the preformed sleeve is subsequently submitted to a cutting step following a helical-extension cutting line, the pitch of which is preferably the same as, or a multiple of the pitch according to which the wrapping of the reinforcing cord layer 1 on the preforming drum has been previously carried out, in order to prevent, as much as possible, cutting the reinforcing cords along their length.

Preferably the cutting is carried out by removing the preformed sleeve from the performing drum and placing it on a rubber drum in which the longitudinal axis of the sleeve is parallel to the axis of rotation of the rubber drum. The sleeve is then helically cut. Following this helical cutting step a semifinished product is obtained in the form of a continuous strip 7 (FIG. 3) of predetermined width and coincident with the pitch of the helical-cutting line, in which grooves 5 produced during the preforming step extend in the transverse direction. Helical cutting is more completely described in U.S. Pat. No. 4,448,621 the disclosure of which is hereby incorporated by reference.

As diagrammatically shown in FIG. 3, the semifinished product in the form of a continuous strip 7 is then wrapped over at least two spaced apart grooved wrapping rollers 8, 9 having their axis of rotation parallel to one another and positioned apart from each other according to a predetermined distance measured from axis to axis of the respective rollers which distance depends on the circumferential length to be given to the finished belts. The grooves of the rollers are parallel with respect to axis of the rollers. In greater detail, the wrapping of the semifinished product 7 obtained by preferably driving in rotation rollers 8, 9 is carried out helically according to a pitch corresponding to the width of the semifinished product itself, so as to produce an annular element 10 exhibiting at least the same width as one of the belts to be obtained.

Advantageously, during the wrapping of the semifinished product 7 the mutual alignment of the transverse grooves 5 present on the individual loops 10a formed from the semifinished product, is also achieved. This alignment results from the engagement of grooves 5 on alignment teeth 8a, 9a which teeth extend longitudinally on each of the wrapping rollers 8, 9 and which are mutually spaced apart a distance corresponding to the toothing pitch "P". The alignment teeth 8a, 9a have a height corresponding to, or greater than the depth "h" of grooves 5. In this way the alignment teeth 8a, 9a can act on the base portion 5a of each individual groove 5, so that the individual loops 10a formed from the semifinished product 7 wrapped on rollers 8, 9 are perfectly levelled.

Advantageously, the engagement of the transverse grooves 5 on the alignment teeth 8a, 9a also enables the perfect alignment of the grooves and the individual loops 10a to be achieved in the wrapping step without tensioning the semifinished product 7. Thus, any risk of deforming the elastomeric material 2, which is still in the raw state, is eliminated.

The annular element 10 obtained from the wrapping step is subsequently trued up by means of grooves 5 and submitted to a pressing step between a molding matrix 11 and an opposing mating mold member 12 which members are pressed together or moved close to each other.

As shown in FIG. 4, flat contact surface 12a of molding element 12 acts on an outer surface 10c of the annular element 10, whereas the molding matrix 11 acts on an inner surface 10b of the annular element by a shaped surface 11a thereof. This shaped surface 11a has ridges 13 matching the shape of the transverse grooves 5 spaced out by recesses matching the shape of the outline of the individual teeth 3 to be obtained.

Following the pressing together of matrix 11 and mold 12, the final trueing up of the respectively aligned grooves 5 belonging to the different loops 10a of the annular element 10 is advantageously obtained. Simultaneously, the elastomeric material 2 located at the projections 3a is urged into the recesses 14 of matrix 11 thereby surely determining the exact formation of teeth 3.

Concurrently with the pressing step, cross-linking of the elastomeric material 2 is carried out by heating matrix 11 and opposite mold 12, in a conventional manner so as to cause the final mutual bonding of loops 10a and structural stabilization of the belt being worked.

As suggested from FIG. 4, the pressing step and the related cross-linking step are carried out according to successive stages, to each of which the execution of said steps on a portion of predetermined length of the annular element 10 corresponds, which length in turn corresponds to the longitudinal extension of matrix 11. In particular, a longitudinal stepping movement is provided to be transmitted to the annular element 10 fitted on rollers of parallel axes, in synchronism with the alternate movement imparted to the matrix 11 and/or opposite mold 12 for pressing and simultaneous cross-linking on the individual portions of the annular element.

The trueing up of grooves 5 ensures the elimination of possible misalignments present between the grooves and/or projections 3a after the wrapping step.

Still in accordance with the present invention, during the pressing step a covering fabric 15 previously interposed between the molding matrix 11 and the annular element itself is preferably applied during the pressing step to the inner surface 10b of the annular element 10. This covering fabric has the function of increasing the mechanical strength of teeth 3 and the wear resistance of the obtained belt.

Provision may be made for the pressing step and other steps of the process related thereto to be carried out directly on the annular element 10 still fitted on the wrapping rollers 8, 9 when the wrapping step is over. In this case the covering fabric 15 should be preferably disposed around the wrapping rollers 8, 9 before or after the execution of the wrapping step of the semifinished product in the form of a strip 7. The covering fabric 15 will be thus disposed intermediate the wrapping rollers 8, 9 and the annular element 10 and will be finally fastened to the annular element as a result of the pressing and cross-linking step.

The preliminary application of the covering fabric 15 during the wrapping step can also be exploited for the purpose of achieving a mutual presetting of the loops 10a forming the annular element 10 should the annular element be disengaged from the wrapping rollers 8, 9 and be transferred to another work station designed to carry out the pressing and cross-linking steps.

Alternatively, the mutual presetting of loops 10a can be obtained through the application of at least a coating sheet of plastic material, not shown, to the outer surface 10c of the annular element 10, still fitted on the wrapping rollers 8, 9. This coating sheet may be optionally eliminated during the following rasping step executed in known and conventional manner on the belt back.

Should the annular element 10 exhibit substantially the same width as that of each individual belt, after the pressing and cross-linking step a trimming step may be executed on the side edges of the annular element so as to give the same a perfectly parallel extension and define the exact belt width.

This trimming operation is also necessary because, in order to be sure to obtain a tooth of the desired form, the elastomeric material of the annular element is always in excess and thus there is the formation of loose threads at the edges of the mould after its being closed with the molding matrix (FIG. 4).

Alternatively, should the width of the annular element 10 be a multiple of the width of each individual belt, before or after the pressing and cross-linking operations a final-cutting step can be executed on the annular element following circumferential lines spaced apart from each other a distance equal to the width of the belts to be produced.

Belts manufactured following the process in question, as a result of the helical cut carried out on the sleeve and the subsequent helical wrapping for producing the annular element 10, will exhibit the respective textile reinforcing layers 1 and coating fabric 4 each structured in the form of a continuous strip forming loops disposed in side-by-side relation and mating at the respective opposite edges.

In addition, belts made in accordance with the invention may be provided with the covering fabric 15 disposed on the respective inner surface thereof exhibiting the teeth 3 and structured in the form of a continuous strip of the same width as the belt.

Another peculiar feature of belts made in accordance with the invention resides in the high ultimate tensile strength they offer. Actually, it has been found that the ultimate tensile strength of the belts of the invention is much higher than 50% of the ultimate tensile strength found on belts made of the same materials and obtained from a circumferential cutting of a sleeve directly molded and vulcanized in the autoclave following the known art. More particularly, the tensile strength of the belts of the invention can easily exceed 85% of the tensile strength found on junction-free belts of the above type.

The slight reduction in the tensile strength of the belts of the invention when compared to the belts obtained from the circumferential cutting of a molded and cross-linked sleeve, is only due to the helical arrangement of the textile fibers forming the layer 1, owing to the helical wrapping carried out on rollers 8 and 9. At all events the strength values obtained by the invention represent an important improvement over conventional belts obtained by butting the opposite ends of a strip length previously cut to size. In these belts, in fact, the ultimate tensile strength does not generally exceed 35% of the ultimate tensile strength detectable on junction-free belts.

During the pressing step of the mold members 11 and 12, the covering 15 is unrolled from a drum and applied to the toothing of the belt substantially as already explained for the plurality of layers applied to the back of the annular element 10.

Advantageously, during the pressing step the covering 15 avoids any leakage of elastomeric material to the outside allowing for the finished belt the appropriate meshing with the surface of the pulley of the transmission.

Furthermore, the covering 15 provides during the pressing step a controlled and uniform flux or elastomeric material between the recesses of the matrix 11.

According to an example, the mutual presetting of the loops 10a of the annular element 10 can be obtained by applying a plurality of pincers which press the two opposite surfaces of one portion of the annular element 10.

The plurality of pincers is used to transport the annular element 10 to the molding elements and the pincers may be used to maintain a portion of the annular element 10 between the matrix 11 and the mold 12.

Further as already cited, according to the most preferred method of the invention, a quantity of elastomeric material which is preformed in the autoclave is less than that required to completely shape the teeth of the belt or to reproduce a finished belt.

For example, the quantity of elastomer used for the sleeve introduced in the autoclave for the preforming cycle may be that quantity needed to shape a belt whose thickness between the back of the belt and the top of the teeth is ⅔ of the thickness desired for the finished belt.

Therefore, prior to cross-linking the preformed belt a plurality of layers of non-cured or noncross-linked elastomeric material reciprocally overlapped, are applied around the outermost surface of the annular element 10 covering all the adjacent turns of the strip 7.

Preferably, the plurality of layers forming a single foil are unrolled from a drum placed at the right side of FIG. 4.

To complete a belt, the first edge of the said plurality of layers is unrolled from the corresponding drum and a length thereof is applied to the first portion of the annular element 10 to be pressed between the matrix 11 and the mold 12.

Successively, after the pressing and curing of the first portion of the belt, the mold 12 and the matrix 11 are separated and further pieces or lengths of the said plurality of layers are unrolled from the drum and placed onto a non-cured, not yet pressed sections of the belt which are then press-heated cross-linked.

The number of layers selected is determine, after the pressing step, so that the desired thickness of the finished belt between its back and the top of the teeth can be obtained.

Preferably the composition of the elastomer material of the sleeve in the preforming cycle and that of the said plurality of layers is the same.

Advantageously, during the pressing step, the plurality of layers physically connects all the adjacent turns of the strip 7 determining a single annular element.

Further, the said plurality of layers fills in any voids or discontinuities that could exist between adjacent turns of the strip 7 and determine uniformity of thickness for the whole length and width of the finished belt.

Still advantageously, the plurality of layers forms a resistant structure opposed to any reciprocal sliding between adjacent turns of the strip 7 when the finished belt is associated with two pulleys whose axis are not aligned in the same direction.

Preferably, the method comprises the step of forming an inner coating fabric 4 of reduced thickness for the sleeve introduced in the autoclave and a covering fabric 15 placed, before the pressing step, on the whole width on the inner surface of the belt.

The total thickness of the fabric 4 and the covering 15 must be determined from the finished belt, after the pressing step, a thickness between the cords 1 and the center of the groove, as required for the appropriate meshing of the belt with the pulleys of the transmission.

More specifically, the thickness of the finished belt, measured from the plane of the longitudinal cords 1 to the center of the groove between adjacent teeth of the belt, must correspond to the value of the known parameter "a" defined as the PDL (Pitch Difference length).

For example, said parameter "a" has a value of 0.685 mm for a belt having the following geometrical parameters:
pitch=8 mm
height between the land area and the top of the tooth=3.2 mm
total thickness=5.2 mm
pressure angle=16°
root of the tooth a 5.50 mm In the same example one of the pulleys of the transmission has the following geometrical parameters:
Teeth=30
Diameter of the pitch line=76.39 mm
Diameter of the outer circumference of the pulley is 76.39–2×"a" which is calculated as follows: 76.39–2×0.685= 75.02

The fabric 4 and the covering 15 may have following characteristics:
Covering 15.
Material=for example nylon.
Weight=between 180 and 300 gr/mq and more preferably between 220 and 250 gr/mq
Thickness=between 0.75 and 0.85 mm
Elasticity=between 7% and 15%.

The elasticity is measured applying a tensile stress of 2 kg to a sample of fabric having the length of one meter and a width of 10 centimeter.
Fabric 4.
Thickness of about 0.25 and 0.30 mm.

Therefore the present invention achieves important advantages as compared to the known art.

It will be recognized, among other things, that based on knowledge in this field, the irregularity of grooves 5 and surface projections 3a obtained in the preforming step would be interpreted as an adverse factor affecting the satisfactory manufacture of a finished product.

On the contrary, surprisingly the invention succeeds in advantageously exploiting the presence of said hollows, even if of irregular form, for achieving the perfect alignment of the individual loops 10a and surface projections 3a in the following wrapping and pressing steps, making thereby possible the accomplishment of a final product offering excellent qualitative features.

In particular, circular, trapezoidal and parabolic-sided teeth, and in general teeth of any form, can be obtained.

In addition it is possible on demand to convert a projection of the annular element for example of circular form into one in which the tooth sides are for example of parabolic or hyperbolic form by merely disposing the same type of annular element between molds of the desired configuration.

Obviously modifications and variations may be made to the invention as conceived, all of them falling within the scope of the inventive idea characterizing it; for example it is possible to achieve belts having a single fabric on the toothing, of the same width as that of the belt itself.

We claim:

1. A toothed belt of elastomeric material, comprising:

at least a reinforced cord layer of annular configuration;

at least a layer of elastomeric material incorporating said reinforced cord layer and supporting a plurality of spaced apart teeth extending radially inwardly relative to the circumferential extension of the belt;

said reinforced cord layer structured in the form of a continuous strip helically wrapped in several loops, said strips disposed in a side-by-side relation and mating at respective opposite edges;

said toothed belt further comprising at least a covering fabric applied to said elastomeric layer, said covering fabric being structured in the form of a continuous strip having the same width as the belt.

2. The toothed belt of claim 1 wherein said teeth are spaced equidistant apart according to a predetermined toothing pitch.

3. The toothed belt of claim 1 wherein said covering fabric is applied to the surface of the elastomeric layer having thereon said spaced apart radially inwardly extending teeth.

4. A belt according to claim 1 further comprising at least a coating fabric applied to the surface of the elastomeric material supporting said teeth, said coating fabric being structured in the form of a continuous strip wrapped in several side-by-side loops and mating at the respective opposite edges.

5. A belt comprising an annular element having a plurality of teeth spaced apart by grooves and incorporating longitudinally extending reinforcing cords, said belt being manufactured in respective steps comprising: helically wrapping a strip of non-cross-linked elastomeric material incorporating longitudinally extending reinforced cords in a plurality of loops disposed in mutual side-by-side relation producing said annular element, said elastomeric material having teeth partially shaped thereon;

molding the annular element by pressing the annular element between a matrix and an opposing mold member and curing the annular element to impart a final shape to said teeth wherein a fabric having the same width of said plurality of loops disposed in mutual side-by-side relation is applied to the plurality of teeth and grooves during molding such that the finished thickness of the belt, measured from the plane of the longitudinal cords to the center of the grooves, corresponds to a predetermined value for obtaining the appropriate meshing of the belt with a toothed pulley.

6. A belt according to claim 5 further comprising at least a coating fabric applied to the inner surface of the elastomeric material, said coating fabric being structured in the form of a continuous strip wrapped in several side-by-side loops and mating at the respective opposite edges.

* * * * *